US010541997B2

(12) United States Patent
Bhaya et al.

(10) Patent No.: US 10,541,997 B2
(45) Date of Patent: Jan. 21, 2020

(54) AUTHENTICATION OF PACKETIZED AUDIO SIGNALS

(71) Applicant: Google Inc., Mountain View, CA (US)

(72) Inventors: Gaurav Bhaya, Sunnyvale, CA (US); Robert Stets, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/395,729

(22) Filed: Dec. 30, 2016

(65) Prior Publication Data
US 2018/0191711 A1 Jul. 5, 2018

(51) Int. Cl.
| | |
|---|---|
| *H04L 29/06* | (2006.01) |
| *H04L 29/08* | (2006.01) |
| *H04W 4/02* | (2018.01) |
| *G10L 17/24* | (2013.01) |
| *G10L 17/02* | (2013.01) |
| *G10L 25/51* | (2013.01) |
| *G10L 15/18* | (2013.01) |

(Continued)

(52) U.S. Cl.
CPC .......... *H04L 63/0861* (2013.01); *G06F 21/32* (2013.01); *G06F 21/34* (2013.01); *G10L 15/1822* (2013.01); *G10L 17/02* (2013.01); *G10L 17/24* (2013.01); *G10L 25/51* (2013.01); *H04L 67/02* (2013.01); *H04L 67/142* (2013.01); *H04L 67/20* (2013.01); *H04W 4/025* (2013.01); *G06F 2221/2111* (2013.01); *G06F 2221/2115* (2013.01); *G10L 2015/088* (2013.01)

(58) Field of Classification Search
CPC ... H04L 67/20; H04L 67/142; H04L 63/0861; H04W 4/025; G06F 21/34; G06F 2221/2115; G10L 25/51; G10L 17/02; G10L 17/24; G10L 15/1822
See application file for complete search history.

(56) References Cited

U.S. PATENT DOCUMENTS

| | | |
|---|---|---|
| 6,275,806 B1 | 8/2001 | Pertrushin |
| 6,421,453 B1 | 7/2002 | Kanevsky et al. |
| (Continued) | | |

OTHER PUBLICATIONS

Close, "Amazon Echo Will Give You These Deals If You Order Through Alexa This Weekend," Web Article, Nov. 18, 2016, Time. com (2 pages).

(Continued)

*Primary Examiner* — Alexander Lagor
*Assistant Examiner* — William B Jones
(74) *Attorney, Agent, or Firm* — Foley & Lardner LLP; James De Vellis

(57) ABSTRACT

The present disclosure is generally directed a data processing system for authenticating packetized audio signals in a voice activated computer network environment. The data processing system can improve the efficiency and effectiveness of auditory data packet transmission over one or more computer networks by, for example, disabling malicious transmissions prior to their transmission across the network. The present solution can also improve computational efficiency by disabling remote computer processes possibly affected by or caused by the malicious audio signal transmissions. By disabling the transmission of malicious audio signals, the system can reduce bandwidth utilization by not transmitting the data packets carrying the malicious audio signal across the networks.

20 Claims, 4 Drawing Sheets

(51) Int. Cl.
  *G06F 21/34*   (2013.01)
  *G06F 21/32*   (2013.01)
  *G10L 15/08*   (2006.01)

(56) References Cited

U.S. PATENT DOCUMENTS

| | | | |
|---|---|---|---|
| 6,684,249 B1 | 1/2004 | Frerichs et al. | |
| 6,857,007 B1 | 2/2005 | Bloomfield | |
| 7,636,456 B2 | 12/2009 | Collins et al. | |
| 7,853,255 B2 | 12/2010 | Karaoguz et al. | |
| 8,027,518 B2 | 9/2011 | Baker et al. | |
| 8,091,100 B2 | 1/2012 | Donato | |
| 8,195,133 B2 | 6/2012 | Ramer et al. | |
| 8,386,386 B1 | 2/2013 | Zhu | |
| 8,504,691 B1* | 8/2013 | Tobler | H04L 67/02 370/229 |
| 8,769,557 B1 | 7/2014 | Terrazas | |
| 8,903,716 B2 | 12/2014 | Chen et al. | |
| 2005/0185779 A1 | 8/2005 | Toms | |
| 2007/0097975 A1 | 5/2007 | Rakers et al. | |
| 2007/0127688 A1 | 6/2007 | Doulton | |
| 2009/0217324 A1 | 8/2009 | Massimi | |
| 2009/0262069 A1 | 10/2009 | Huntington | |
| 2010/0306394 A1 | 12/2010 | Brown et al. | |
| 2011/0314530 A1* | 12/2011 | Donaldson | G06F 21/83 726/7 |
| 2012/0265528 A1 | 10/2012 | Gruber et al. | |
| 2013/0097682 A1 | 4/2013 | Zeljkovic et al. | |
| 2013/0117022 A1 | 5/2013 | Chen et al. | |
| 2013/0156273 A1 | 6/2013 | Nielsen | |
| 2013/0173765 A1 | 7/2013 | Korbecki | |
| 2013/0275164 A1 | 10/2013 | Gruber et al. | |
| 2013/0304758 A1 | 11/2013 | Gruber et al. | |
| 2013/0329966 A1 | 12/2013 | Hildreth | |
| 2014/0222436 A1 | 8/2014 | Binder et al. | |
| 2014/0249817 A1 | 9/2014 | Hart et al. | |
| 2015/0090781 A1* | 4/2015 | Yang | H04L 69/08 235/375 |
| 2015/0142438 A1 | 5/2015 | Dai et al. | |
| 2015/0371639 A1 | 12/2015 | Foerster et al. | |
| 2016/0093304 A1* | 3/2016 | Kim | G10L 17/26 704/235 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |
| 2018/0033438 A1 | 2/2018 | Toma et al. | |

OTHER PUBLICATIONS

Cook, "A Siri for advertising: These mobile ads talk back to you," Web Article, Apr. 1, 2013, Geekwire.com (7 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
"Amazon and Google Want to Turn Their Smart Home Speakers Into Telephone Replacements—MacRumors" MacRumors, 9 pages.
"Apple Patent Reveals a New Security Feature Coming to Siri" 6 pages.
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
Collins, Terry "Can Twitter Save itself? The Social Network is Slowly gaining users, but still Lags Far Behind Rivals. Is a Turnaround Possible?" 3 pages.
Golgowski, Nina, "This Burger King Ad Is Trying to Control Your Google Home Device", Apr. 12, 2017, 7 pages.
Larson, Selena "Google Home Now Recognizes your Individual Voice" dated Apr. 20, 2017, 3 pages.
Nieva, Richard, "Google Home and eBay can tell you how much that's worth", 3 pages.
Purcher, Jack "Today Google Home's Virtual Assistant Can Learn its Owner's Voice for Security Reason's like Apple's Patent Pending Idea" Apr. 20, 2017, 4 pages.
Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
Siegal, Daniel, "IP Attys Load Up Apps' Legal Challenges At Silicon Beach" 6 pages.
"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition within Messages", MacRumors, May 11, 2017 (7 pages).
Chen, Lulu Yilun, "Alibaba Challenges Google, Amazon With New Echo-Like Device", Bloomberg Technology, Jul. 5, 2017 (3 pages).
Coberly, "Apple patent filing reveals potential whispering Siri functionality", Techspot, Dec. 14, 2017, 4 pages.
Crist, Ry, "Logitech Harmony's Alexa Skill just got a whole lot better", cnet, Jul. 13, 2017 (2 pages).
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be bridge between Amazon's Alexis, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", cnet, May 20, 2017 (7 pages).
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Google Developers, "GoogleAssistant SDK" reprinted from https://developers.google.com/assistant/sdk/ on Aug. 22, 2017 (4 pages).
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
International Search Report and Written Opinion on PCT Application No. PCT/US2017/049721 dated Dec. 1, 2017.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).

(56) References Cited

OTHER PUBLICATIONS

Koetsier, John, "Ads on Amazon Echo: Wendy's, ESPN, and Progressive Among Brands Testing", Forbes, May 11, 2017 (2 pages).
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lee, Dave, "The five big announcements from Google I/O", BBC News, May 18, 2017 (9 pages).
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Office Action on U.S. Appl. No. 13/843,559 dated Jan. 12, 2015.
Office Action on U.S. Appl. No. 13/843,559 dated Jun. 16, 2014.
Office Action on U.S. Appl. No. 14/933,937 dated Dec. 19, 2016.
Office Action on U.S. Appl. No. 14/933,937 dated Jun. 9, 2016.
Office Action on U.S. Appl. No. 14/933,937 dated May 10, 2017.
Office Action on U.S. Appl. No. 14/933,937 dated Nov. 17, 2017.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, "'I'm sorry to hear that': Why training Siri to be a therapist won't be easy", CBC News, Sep. 24, 2017, 3 pages.
Sablich, Justin, "Planning a Trip With the Help of Google Home", New York Times, May 31, 2017 (6 pages).
Sahota, Mantej Singh, "Voice Recognition System Based on Audio Fingerprinting", Fall 2010. Available at http://csus-dspace.calstate.edu/bitstream/handle/10211.9/838/Report.pdf?sequence=1.
Smith, Dave, "The Amazon Echo got 2 incredibly useful features thanks to a new update", Business Insider, Jun. 1, 2017 (5 pages).
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017 (6 pages).
Buckland et al., "Amazon's Alexa Takes Open-Source Route to Beat Google Into Cars", Bloomberg, Feb. 27, 2018, 6 pages.
Final Office Action on U.S. Appl. No. 14/933,937 dated Nov. 20, 2018.
Final Office Action on U.S. Appl. No. 15/628,279 dated Jan. 28, 2019.
Final Office Action on U.S. Appl. No. 15/638,316 dated Feb. 4, 2019.
International Preliminary Report for Application No. PCT/US2017/049721 dated Aug. 13, 2018.
Japanese Office Action dated Feb. 8, 2019 for application 2017-556917.
Non-Final Office Action on U.S. Appl. No. 15/863,042 dated Apr. 3, 2019.
Office Action on U.S. Appl. No. 15/638,316 dated Jul. 3, 2018.
Office Action on U.S. Appl. No. 14/933,937 dated Apr. 19, 2018.
Office Action on U.S. Appl. No. 15/628,279 dated Jun. 25, 2018.
U.S. Non-Final Office Action on U.S Appl. No. 15/638,316, dated Aug. 22, 2019, 17 pages.

* cited by examiner

AUTHENTICATION OF PACKETIZED AUDIO SIGNALS

BACKGROUND

Excessive network transmissions, packet-based or otherwise, of network traffic data between computing devices can prevent a computing device from properly processing the network traffic data, completing an operation related to the network traffic data, or responding timely to the network traffic data. The excessive network transmissions of network traffic data can also complicate data routing or degrade the quality of the response if the responding computing device is at or above its processing capacity, which may result in inefficient bandwidth utilization. A portion of the excessive network transmissions can include malicious network transmissions.

SUMMARY

The present disclosure is generally directed to authenticating packetized audio signals in a voice activated computer network environment to reduce the amount of excessive network transmissions. A natural language processor component executed by a data processing system can receive data packets. The data packets can include an input audio signal detected by a sensor of a client computing device. The natural language processor component can parse the input audio signal to identify a request and a trigger keyword corresponding to the request. A network security appliance can analyze one or more characteristics of the input audio signal. Based on the characteristics, the network security appliance can set an alarm condition. The network security appliance can provide, to a content selector component of the data processing system, an indication of the alarm condition. The content selector component can select, based on the alarm condition, a content item via a real-time content selection process. An audio signal generator component executed by the data processing system can generate an output signal comprising the content item. An interface of the data processing system can transmit data packets comprising the output signal generated by the audio signal generator component to cause an audio driver component executed by the client computing device to drive a speaker of the client computing device to generate an acoustic wave corresponding to the output signal. The data processing system can receive a response audio signal. The response audio signal is received in response to the output signal generated by the client computing device. The response audio signal can include characteristics, which are analyzed by the network security appliance. Based on the characteristics of the response audio signal, the network security appliance can terminate or suspend a communication session between a service provider and client computing device.

According to one aspect of the disclosure, a system for authenticating packetized audio signals in a voice activated computer network environment can include a natural language processor component that is executed by a data processing system. The natural language processor can receive, via an interface of the data processing system, data packets that include an input audio signal detected by a sensor of a client device. The natural language processor component can parse the input audio signal to identify a request and a trigger keyword corresponding to the request. The system can include a direct action application programming interface of the data processing system that can generate, based on the trigger keyword, a first action data structure responsive to the request. The system can also include a network security appliance that can compare the first action data structure with a first characteristic of the input audio signal to detect an alarm condition. The system can include a content selector component that is executed by the data processing system. The content selector can receive the trigger keyword identified by the natural language processor and the indication of the first alarm condition, and select, based on the trigger keyword and the indication, a content item. The network security appliance can receive data packets carrying a response audio signal transmitted between the client device and a conversational application programming interface that established a communication session with the client device. The network security appliance can compare a second characteristic of the response audio signal with the first characteristic of the input audio signal to detect a second alarm condition. The network security appliance can transmit, based on the second alarm condition, an instruction to the third party provider device to disable the communication session established with the client device.

According to another aspect of the disclosure a method for authenticating packetized audio signals in a voice activated computer network environment can include receiving, by a natural language processor component executed by a data processing system, data packets including an input audio signal detected by a sensor of a client device. The method can also include parsing, by the natural language processor component, the input audio signal to identify a request and a trigger keyword corresponding to the request. The method can include generating, by a direct action application programming interface of the data processing system, based on the trigger keyword, a first action data structure responsive to the request. The method can include comparing, by a network security appliance, the first action data structure with a first characteristic of the input audio signal to detect an alarm condition. The method can include selecting, by a content selector component executed by the data processing system, a content item based on the trigger keyword and the alarm condition. The method can include receiving, by the network security appliance, data packets carrying a response audio signal transmitted between the client device and a conversational application programming interface that established a communication session with the client device. The method can include comparing, by the network security appliance, a second characteristic of the response audio signal with the first characteristic of the input audio signal to detect a second alarm condition. The method can include transmitting, by the network security appliance, based on the second alarm condition, an instruction to the third party provider device to disable the communication session established with the client device in response to the interaction with the content item.

According to one aspect of the disclosure, a system for authenticating packetized audio signals in a voice activated computer network environment can include a natural language processor component that is executed by a data processing system. The natural language processor can receive, via an interface of the data processing system, data packets that include an input audio signal detected by a sensor of a client device. The natural language processor component can parse the input audio signal to identify a request and a trigger keyword corresponding to the request. The system can include a direct action application programming interface of the data processing system that can generate, based on the trigger keyword, a first action data structure responsive to the request. The system can also include a network security appliance that can compare the first action data structure with a first characteristic of the input audio signal to detect an alarm condition. The system can include a content selector component that is executed by the data processing system. The content selector can receive the trigger keyword identified by the natural language processor and the indication of the first alarm condition, and select, based on the trigger keyword and the indication, a content item. The network security appliance can receive data packets carrying a response audio signal transmitted between the client device and a conversational application programming interface that established a communication session with the client device. The network security appliance can compare a second characteristic of the response audio signal with the first characteristic of the input audio signal to detect a pass condition. The network security appliance can transmit, based on the second alarm condition, an instruction to the third party provider device to continue the communication session established with the client device.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
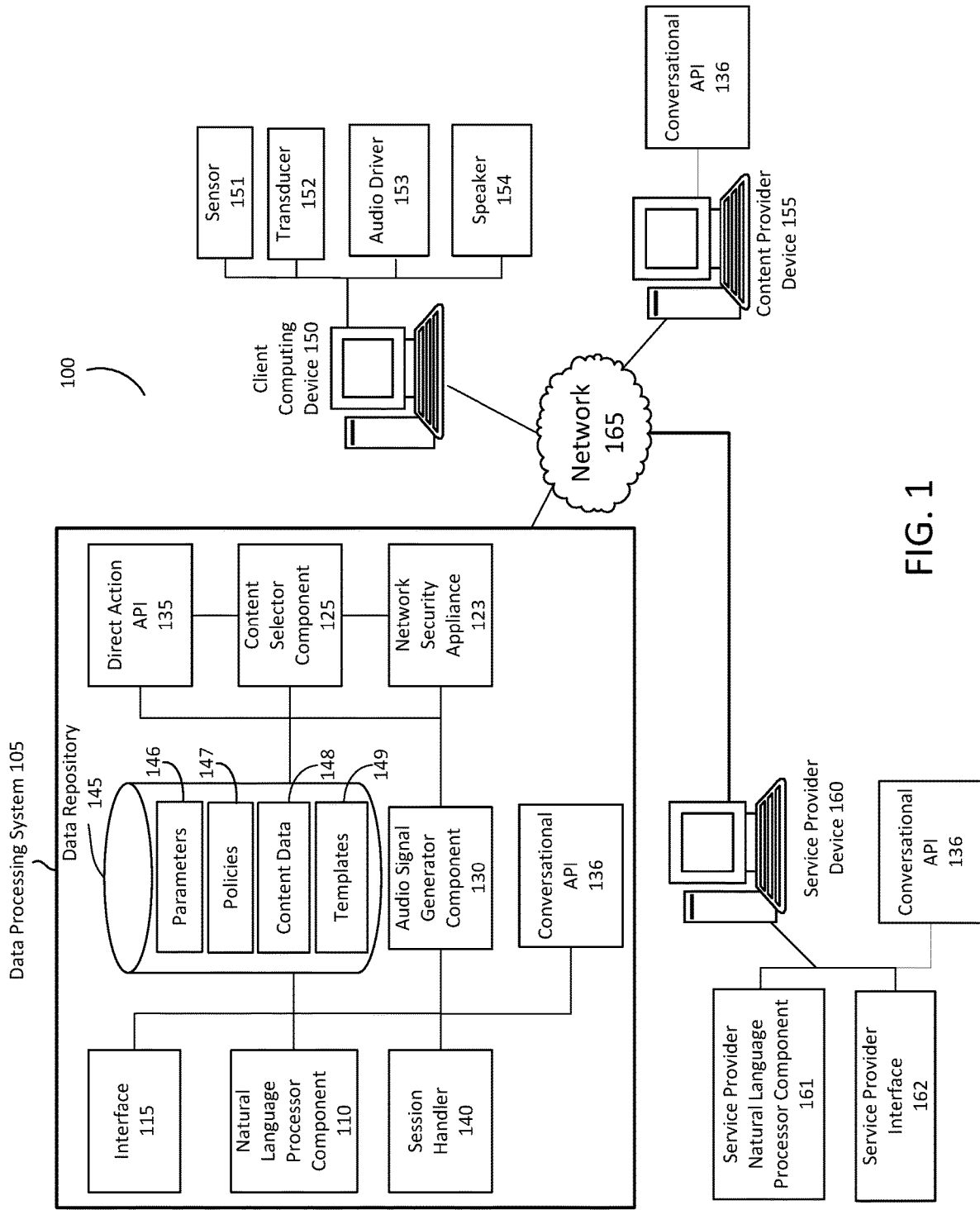
FIG. 1 depicts an example system to perform authentication of packetized audio signals in a voice activated data packet (or other protocol) based computer network environment.

Following below are more detailed descriptions of various concepts related to, and implementations of, methods, apparatuses, and systems for the authentication of packetized audio signals. The various concepts introduced above and discussed in greater detail below may be implemented in any of numerous ways.

The present disclosure is generally directed a data processing system for authenticating packetized audio signals in a voice activated computer network environment. The data processing system can improve the efficiency and effectiveness of auditory data packet transmission over one or more computer networks by, for example, disabling malicious transmissions prior to their transmission across the network. The present solution can also improve computational efficiency by disabling remote computer processes possibly affected by or caused by the malicious audio signal transmissions. By disabling the transmission of malicious audio signals, the system can reduce bandwidth utilization by not transmitting the data packets carrying the malicious audio signal across the networks. Processing the naturally spoken audio signal can be a computationally intensive task. By detecting possibly malicious audio signals, the system can reduce computational waste by enabling the system to skip or temporarily skip the processing of possibly malicious audio signals. The system can reduce computational waste by disabling communication sessions when the malicious activity is detected.

The systems and methods described herein can include a data processing system that receives an audio input query, which can also be referred to as an audio input signal. From the audio input query the data processing system can identify a request and a trigger keyword corresponding to the request. The system can generate action data structures based on the audio input query. The system can also measure characteristics of the audio input query. The system can determine if the characteristics of the audio input query match predicted or expected characteristics of the audio input query. If the characteristics do not match the expected characteristics, the system can select a content item that is transmitted back to the source of the audio input query. A communication session can be started with the source. The content item can include an output signal that can be played through a speaker associated with the source. The system can receive a response audio signal to the content item. The response audio signal can also include characteristics that are compared by the system to expected characteristics. If the characteristics of the response audio signal do not match the expected characteristics, the system can disable the communication sessions with the source and prevent the source from initiating communication sessions with third-party service providers or content providers, which saves network bandwidth, reduces processor utilization, and saves electrical power.

The present solution can prevent the transmission of insecure audio-based user interactions by authenticating the interaction. Securing audio-based user interactions can prevent malicious processes from being executed under the user (or other's) account. Preventing the execution of malicious processes can also reduce network bandwidth utilization and reduce processor utilization or load. The present solution can reduce network bandwidth utilization by terminating the transmission of unauthorized audio-based user interactions.

FIG. 1 depicts an example system 100 to perform authentication of packetized audio signals in a voice activated data packet (or other protocol) based computer network environment. The system 100 can include at least one data processing system 105. The data processing system 105 can include at least one server having at least one processor. For example, the data processing system 105 can include a plurality of servers located in at least one data center or server farm. The data processing system 105 can determine from an audio input signal a request and a trigger keyword associated with the request. Based on the request and trigger keyword the data processing system 105 can determine or select a thread that includes a plurality of sequence-dependent operations and can select content items (and initiate other actions as described herein) in an order that does not match the sequence of dependent operations, for example as part of a voice activated communication or planning system.

The content items can include one or more audio files that when rendered provide an audio output or acoustic wave. The content items can include other content (e.g., text, video, or image content) in addition to audio content.

The data processing system 105 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 105 can include servers in a data center that are stored in one or more high-density rack systems, along with associated storage systems, located for example in an enterprise data center. The data processing system 105 with consolidated servers in this way can improve system manageability, data security, the physical security of the system, and system performance by locating servers and high performance storage systems on localized high performance networks. Centralization of all or some of the data processing system 105 components, including servers and storage systems, and coupling them with advanced system management tools allows more efficient use of server resources, which saves power and processing requirements and reduces bandwidth usage.

The data processing system 105 can include at least one natural language processor (NLP) component 110, at least one interface 115, at least one network security appliance 123, at least one content selector component 125, at least one audio signal generator component 130, at least one direct action application programming interface (API) 135, at least one session handler component 140, at least one communication API 136, and at least one data repository 145. The NLP component 110, interface 115, network security appliance 123, content selector component 125, audio signal generator component 130, direct action API 135, and session handler component 140 can each include at least one processing unit, server, virtual server, circuit, engine, agent, appliance, or other logic device such as programmable logic arrays configured to communicate with the data repository 145 and with other computing devices (e.g., the client computing device 150, the content provider computing device 155, or the service provider computing device 160) via the at least one computer network 165. The network 165 can include computer networks such as the internet, local, wide, metro or other area networks, intranets, satellite networks, other computer networks such as voice or data mobile phone communication networks, and combinations thereof.

The session handler component 140 can establish a communication session between the data processing system 105 and the client computing device 150. The session handler component 140 can generate the communication session based on receiving an input audio signal from the computing device 150. The session handler component 140 can set the initial duration of the communication session base on the time of day, location of the client computing device 150, context of the input audio signal, or a voiceprint. The session handler component 140 can terminate the communication session after expiration of the session. Authentication may only be needed once per communication session. For example, the data processing system 105 can determine that there was a previous successful authentication during the communication session, and not require an additional authentication until after the communication session expires.

The network 165 can include or constitute a display network, e.g., a subset of information resources available on the internet that are associated with a content placement or search engine results system, or that are eligible to include third party content items as part of a content item placement campaign. The network 165 can be used by the data processing system 105 to access information resources such as web pages, web sites, domain names, or uniform resource locators that can be presented, output, rendered, or displayed by the client computing device 150. For example, via the network 165 a user of the client computing device 150 can access information or data provided by the content provider computing device 155 or the service provider computing device 160.

The network 165 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 165 can include a wireless link, such as an infrared channel or satellite band. The topology of the network 165 may include a bus, star, or ring network topology. The network 165 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 150, the content provider computing device 155, and the service provider computing device 160 can each include at least one logic device such as a computing device having a processor to communicate with each other or with the data processing system 105 via the network 165. The client computing device 150, the content provider computing device 155, and the service provider computing device 160 can each include at least one server, processor or memory, or a plurality of computation resources or servers located in at least one data center. The client computing device 150, the content provider computing device 155, and the service provider computing device 160 can each include at least one computing device such as a desktop computer, laptop, tablet, personal digital assistant, smartphone, portable computer, thin client computer, virtual server, or other computing device.

The client computing device 150 can include at least one sensor 151, at least one transducer 152, at least one audio driver 153, and at least one speaker 154. The sensor 151 can include a microphone or audio input sensor. The sensor 151 can also include at least one of a GPS sensor, proximity sensor, ambient light sensor, temperature sensor, motion sensor, accelerometer, or gyroscope. The transducer 152 can convert the audio input into an electronic signal. The audio driver 153 can include a script or program executed by one or more processors of the client computing device 150 to control the sensor 151, the transducer 152 or the audio driver 153, among other components of the client computing device 150 to process audio input or provide audio output. The speaker 154 can transmit the audio output signal.

The client computing device 150 can be associated with an end user that enters voice queries as audio input into the client computing device 150 (via the sensor 151) and receives audio output in the form of a computer generated voice that can be provided from the data processing system 105 (or the content provider computing device 155 or the service provider computing device 160) to the client computing device 150, output from the speaker 154. The computer generated voice can include recordings from a real person or computer generated language.

The content provider computing device 155 can provide audio based content items for display by the client computing device 150 as an audio output content item. The content item can include an offer for a good or service, such as a voice based message that states: "Would you like me to order you a taxi?" For example, the content provider computing device 155 can include memory to store a series of audio content items that can be provided in response to a voice based query. The content provider computing device 155 can also provide audio based content items (or other content items) to the data processing system 105 where they can be stored in the data repository 145. The data processing system 105 can select the audio content items and provide (or instruct the content provider computing device 155 to provide) the audio content items to the client computing device 150. The content can include security questions that are generated to authenticate the user of the client computing device 150. The audio based content items can be exclusively audio or can be combined with text, image, or video data.

The service provider computing device 160 can include at least one service provider natural language processor (NLP) component 161 and at least one service provider interface 162. The service provider NLP component 161 (or other components such as a direct action API of the service provider computing device 160) can engage with the client computing device 150 (via the data processing system 105 or bypassing the data processing system 105) to create a back-and-forth real-time voice or audio based conversation (e.g., a session) between the client computing device 150 and the service provider computing device 160. For example, the service provider interface 162 can receive or provide data messages to the direct action API 135 of the data processing system 105. The service provider computing device 160 and the content provider computing device 155 can be associated with the same entity. For example, the content provider computing device 155 can create, store, or make available content items for a car sharing service, and the service provider computing device 160 can establish a session with the client computing device 150 to arrange for a delivery of a taxi or car of the car share service to pick up the end user of the client computing device 150. The data processing system 105, via the direct action API 135, the NLP component 110 or other components can also establish the session with the client computing device, including or bypassing the service provider computing device 160, to arrange for example for a delivery of a taxi or car of the car share service.

The service provider device 160, the content provider device 155, and the data processing system 105 can include a conversational API 136. The end user can interact, via a voice conversation, with the content items and the data processing system 105 via a communication session. The voice conversation can be between the client device 150 and the conversational API 136. The conversational API 136 can be executed by the data processing system 105, service provider 160, or content provider 155. The data processing system 105 can obtain additional information about the end user's interaction with the content directly when the data processing system executes the conversational API 136. When the service provider 160 or content provider 155 execute the conversational API 136, the communication session can either be routed through the data processing system 105, or the respective entities can forward data packets of the communication session to the data processing system 105. The networking security appliance described herein can terminate the communication session when the conversational API 136 is executed by the data processing system 105. The networking security appliance 105 can send instructions to the service provider 160 or content provider 155 to terminate (or otherwise disable) the communication session when the service provider 160 or content provider 155 execute the conversational API 136.

The data repository 145 can include one or more local or distributed databases and can include a database management system. The data repository 145 can include computer data storage or memory and can store one or more parameters 146, one or more policies 147, content data 148, or templates 149 among other data. The parameters 146, policies 147, and templates 149 can include information such as rules about a voice based session between the client computing device 150 and the data processing system 105 (or the service provider computing device 160). The content data 148 can include content items for audio output or associated metadata, as well as input audio messages that can be part of one or more communication sessions with the client computing device 150.

The data processing system 105 can include an application, script or program installed at the client computing device 150, such as an app to communicate input audio signals to the interface 115 of the data processing system 105 and to drive components of the client computing device to render output audio signals. The data processing system 105 can receive data packets or other signals that include or identify an audio input signal. For example, the data processing system 105 can execute or run the NLP component 110 to receive the audio input signal. The audio input signal can be detected by the sensor 151 (e.g., a microphone) of the client computing device. The NLP component 110 can convert audio input signal into recognized text by comparing the input signal against a stored, representative set of audio waveforms and choosing the closest matches. The representative waveforms can be generated across a large set of input signals. The user can provide some of the input signals. Once the audio signal is converted into recognized text, the NLP component 110 can match the text to words that are associated, for example via a learning phase, with actions that the system 200 can make. Via the transducer 152, the audio driver 153, or other components, the client computing device 150 can provide the audio input signal to the data processing system 105 (e.g., via the network 165) where it can be received (e.g., by the interface 115) and provided to the NLP component 110 or stored in the data repository 145 as content data 148.

The NLP component 110 can obtain the input audio signal. From the input audio signal, the NLP component 110 can identify at least one request or at least one trigger keyword corresponding to the request. The request can indicate intent or subject matter of the input audio signal. The trigger keyword can indicate a type of action likely to be taken. For example, the NLP component 110 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport; however, the trigger keyword indicates that transport is an ancillary action to at least one other action that is indicated by the request.

The content selector component 125 can obtain this information from the data repository 145, where it can be stored as part of the content data 148. The content selector component 125 can query the data repository 145 to select or otherwise identify the content item, e.g., from the content data 148. The content selector component 125 can also select the content item from the content provider computing device 155. For example responsive to a query received from the data processing system 105, the content provider computing device 155 can provide a content item to the data processing system 105 (or component thereof) for eventual output by the client computing device 150.

The audio signal generator component 130 can generate or otherwise obtain an output signal that includes the content item. For example, the data processing system 105 can execute the audio signal generator component to generate or create an output signal corresponding to the content item. The interface 115 of the data processing system 105 can provide or transmit one or more data packets that include the output signal via the computer network 165 to the client computing device 150. For example the data processing system 105 can provide the output signal from the data repository 145 or from the audio signal generator component 130 to the client computing device 150. The data processing system 105 can also instruct, via data packet transmissions, the content provider computing device 155 or the service provider computing device 160 to provide the output signal to the client computing device 150. The output signal can be obtained, generated, transformed to or transmitted as one or more data packets (or other communications protocol) from the data processing system 105 (or other computing device) to the client computing device 150.

The content selector component 125 can select the content item for the action of the input audio signal as part of a real-time content selection process. For example, the content item can be provided to the client computing device for transmission as audio output in a conversational manner in direct response to the input audio signal. The real-time content selection process to identify the content item and provide the content item to the client computing device 150 can occur within one minute or less from the time of the input audio signal and be considered real-time.

The output signal that corresponds to the content item, for example, an output signal that was obtained or generated by the audio signal generator component 130 transmitted via the interface 115 and the computer network 165 to the client computing device 150, can cause the client computing device 150 to execute the audio driver 153 to drive the speaker 154 to generate an acoustic wave corresponding to the output signal. The acoustic wave can include words of or corresponding to the content item.

The direct action API 135 of the data processing system can generate, based on the trigger keyword, action data structures. The direct action API 135 can execute a specified action to satisfy the end user's intention, as determined by the data processing system 105. Depending on the action specified in its inputs, the direct action API 135 can execute code or a dialog script that identifies the parameters required to fulfill a user request. The action data structures can be generated responsive to the request. The action data structure can be included in the messages that are transmitted to or received by the service provider computing device 160. Based on the request parsed by the NLP component 110, the direct action API 135 can determine to which of the service provider computing devices 160 the message should be sent. For example, if an input audio signal includes "order a taxi," the NLP component 110 can identify the trigger word "order" and the request for a taxi. The direct action API 135 can package the request into an action data structure for transmission as a message to a service provider computing device 160 of a taxi service. The message can also be passed to the content selector component 125. The action data structure can include information for completing the request. In this example, the information can include a pick up location and a destination location. The direct action API 135 can retrieve a template 149 from the repository 145 to determine which fields to include in the action data structure. The direct action API 135 can determine necessary parameters and can package the information into an action data structure. The direct action API 135 can retrieve content from the repository 145 to obtain information for the fields of the data structure. The direct action API 135 can populate the fields from the template with that information to generate the data structure. The direct action API 135 can also populate the fields with data from the input audio signal. The templates 149 can be standardized for categories of service providers or can be standardized for specific service providers. For example, ride sharing service providers can use the following standardized template 149 to create the data structure: {client_device_identifier; authentication_credentials; pick_up_location; destination_location; no_passengers; service_level}. The action data structure can then be sent to another component such as the content selector component 125 or to the service provider computing device 160 to be fulfilled.

The direct action API 135 can communicate with the service provider computing device 160 (that can be associated with the content item, such as a car share company) to order a taxi or ride share vehicle for the location of the movie theater at the time the movie ends. The data processing system 105 can obtain this location or time information as part of the data packet (or other protocol) based data message communication with the client computing device 150, from the data repository 145, or from other sources such as the service provider computing device 160 or the content provider computing device 155. Confirmation of this order (or other conversion) can be provided as an audio communication from the data processing system 105 to the client computing device 150 in the form of an output signal from the data processing system 105 that drives the client computing device 150 to render audio output such as, "great, you will have a car waiting for you at 11 pm outside the theater." The data processing system 105, via the direct action API 135, can communicate with the service provider computing device 160 to confirm the order for the car.

The data processing system 105 can obtain the response (e.g., "yes please") to the content item ("would you like a ride home from the movie theater?") and can route a packet based data message to the service provider NLP component 161 (or other component of the service provider computing device). This packet based data message can cause the service provider computing device 160 to effect a conversion, e.g., to make a car pick up reservation outside the movie theater. This conversion—or confirmed order—(or any other conversion of any other action of the thread) can occur prior to completion of one or more actions of the thread, such as prior to completion of the movie, as well as subsequent to completion of one or more actions of the thread, such as subsequent to dinner.

The direct action API 135 can obtain content data 148 (or parameters 146 or policies 147) from the data repository 145, as well as data received with end user consent from the client computing device 150 to determine location, time, user accounts, logistical or other information in order to reserve a car from the car share service. The content data 148 (or parameters 146 or policies 147) can be included in the action data structure. When the content included in the action data structure includes end user data that is used for authentication, the data can be passed through a hashing function before being stored in the data repository 145. Using the direct action API 135, the data processing system 105 can also communicate with the service provider computing device 160 to complete the conversion by, in this example, making the car share pick up reservation.

The data processing system 105 can cancel actions associated with content items. The cancellation of the actions can be in response to the network security appliance 123 generating an alarm condition. The network security appliance 123 can generate an alarm condition when the network security appliance 123 predicts that the input audio signal is malicious or otherwise not provided by an authorized end user of the client computing device 150.

The data processing system 105 can include, interface, or otherwise communicate with a network security appliance 123. The network security appliance 123 can authenticate signal transmissions between the client computing device 150 and the content provider computing device 155. The signal transmissions can be the audio inputs from the client computing device 150 and the audio response signals from the client computing device 150. The audio response signals can be generated in response to content items transmitted to the client computing device 150 by the data processing system 105 during one or more communication sessions. The network security appliance 123 can authenticate the signal transmission by comparing the action data structure to one or more characteristics of the input audio signals and response audio signals.

The network security appliance 123 can determine characteristics of the input audio signal. The characteristics of the audio signal can include voiceprint, a keyword, a number of voices detected, an identification of an audio source, and a location of an audio source. For example, the network security appliance 123 can measure the spectral components of the input audio signal to generate a voiceprint of the voice used to generate the input audio signal. The voiceprint generated in response to the input audio signal can be compared to a stored voiceprint saved by the data processing system 105. The saved voiceprint can be an authenticated voiceprint—for example, a voiceprint generated by an authenticated user of the client computing device 150 during a setup phase of the system.

The network security appliance 123 can also determine non-audio characteristics of the input audio signal. The client computing device 150 can include non-audio information in the input audio signal. The non-audio information can be a location as determined or indicated by the client computing device 150. The non-audio information can include a client computing device 150 identifier. Non-audio characteristics or information can also include physical authentication devices such as challenge-response with a one-time password device or a fingerprint reader.

The network security appliance 123 can set an alarm condition when the characteristics of the input audio signal do not correspond to the action data structure. For example, the network security appliance 123 can detect mismatches between the action data structure and the characteristics of the input audio signal. In one example, the input audio signal can include a location of the client computing device 150. The action data structure can include a predicted location of the end user, such as a location based on the end user's smartphone's general location. If the network security appliance 123 determines that the location of the client computing device 150 is not within a predefined range of the location included in the action data structure, the network security appliance 123 can set an alarm condition. In another example, the network security appliance 123 can compare the voiceprint of the input audio signal to a voiceprint of the end user stored in the data repository 145 and included in the action data structure. If the two voiceprints do not match, the network security appliance 123 can set an alarm condition.

The network security appliance 123 can determine which input audio signal characteristics to base the authentication on responsive to the request in the input audio signal. Authentication with the different characteristics can have different computational requirements. For example, comparing voiceprints can be computationally more intensive than comparing two locations. Selecting authentication methods that are computationally intensive when not called for can be computationally wasteful. The network security appliance 123 can improve the efficiency of the data processing system 105 by selecting the characteristics used for authentication based on the request. For example, when the security risk associated with the input audio signal is low, the network security appliance 123 can select an authentication method using a characteristic that is not computationally intensive. The network security appliance 123 can select the characteristic based on the cost required to complete the request. For example, a voiceprint characteristic can be used when the input audio signal is "order a new laptop computer," but select a location characteristic when the input audio signal is "order a taxi." The selection of the characteristic can be based on the time or computational intensity required to complete the request. Characteristics that consume more computational resources can be used to authenticate input audio signals that generate requests that take more computational resources to complete. For example, the input audio signal is "Ok, I'd like to go to dinner and the movies" can include multiple actions and requests and involve multiple service providers 160. The input audio signal can generate requests to search for possible movies, search for possible restaurant availability, make restaurant reservations, and purchase movie tickets. The completion of this input audio signal is both computationally more intensive and takes longer to complete than the input audio signal "Ok, what time is it?"

The network security appliance 123 can also set an alarm condition based on the request included in the input audio signal. The network security appliance 123 can automatically set an alarm condition if transmission of the action data structure to a service provider computing device 160 can result in a monetary charge to the end user of the client computing device 150. For example, a first input audio signal "Ok, order a pizza" can generate a monetary charge while a second input audio signal "Ok, what time is it" does not. In this example, the network security appliance 123 can automatically set an alarm condition upon receiving an action data structure corresponding to the first input audio signal and not set an alarm condition up receiving an action data structure corresponding to the second input audio signal.

The network security appliance 123 can set an alarm condition based on the determination the action data structure is intended for a specific service provider device 160. For example, the end user of the client computing device 150 can set restrictions on which service providers the data processing system 105 can interact with on the end user's behalf without further authorization. For example, if the end user has a child, to prevent the child from purchasing toys through a service provider that sells toys, the end user can set a restriction that action data structures cannot be transmitted to the toy seller without further authentication. When the network security appliance 123 receives an action data structure intended for a specific service provider device 160, the network security appliance 123 can look up a policy in the data repository to determine if an alarm condition should automatically be set.

The network security appliance 123 can send indications of the alarm condition to the content selector component 125. The content selector component 125 can select a content item to transmit to the client computing device 150. The content item can be an auditory request for a passphrase or additional information to authenticate the input audio signal. The content item can be transmitted to the client computing device 150, where the audio driver 153 converts the content item into sound waves via the transducer 152. The client computing device 150 end user can respond to the content item. The end user's response can be digitized by the sensor 151 and transmitted to the data processing system 105. The NLP component 110 can process the response audio signal and provide the response to the network security appliance 123. The network security appliance 123 can compare a characteristic of the response audio signal with a characteristic of the input audio signal or the action data structure. For example, the content item can be a request for a passphrase. The NLP component 110 can recognize the text of the response audio signal and pass the text to the network security appliance 123. The network security appliance 123 can run a hash function on the text. Having been hashed with the same hashing function, the end user's authenticated passphrase can be saved in the data repository 145. The network security appliance 123 can compare the hashed text with the save, hashed passphrase. If the hashed text and hashed passphrase match, the network security appliance 123 can authenticate the input audio signal. If the hashed text and the hashed pass phase do not match, the network security appliance 123 can set a second alarm condition.

The network security appliance 123 can terminate communication sessions. The network security appliance 123 can transmit instructions to a service provider computing device 160 to disable, pause, or otherwise terminate a communication session established with the client computing device 150. The termination of the communication session can be responsive to the network security appliance 123 setting a second alarm condition. The network security appliance 123 can disable the computing device's ability to generate communication sessions via the data processing system 105 with a service provider computing device 160. For example, if the network security appliance 123 sets a second alarm condition responsive to the input audio signal "Ok, order a taxi," the network security appliance 123 can disable the ability of communication sessions to be established between the client computing device 150 and the taxi service provider device. An authorized user can reauthorize the taxi service provider device at a later time.

Figure 2:
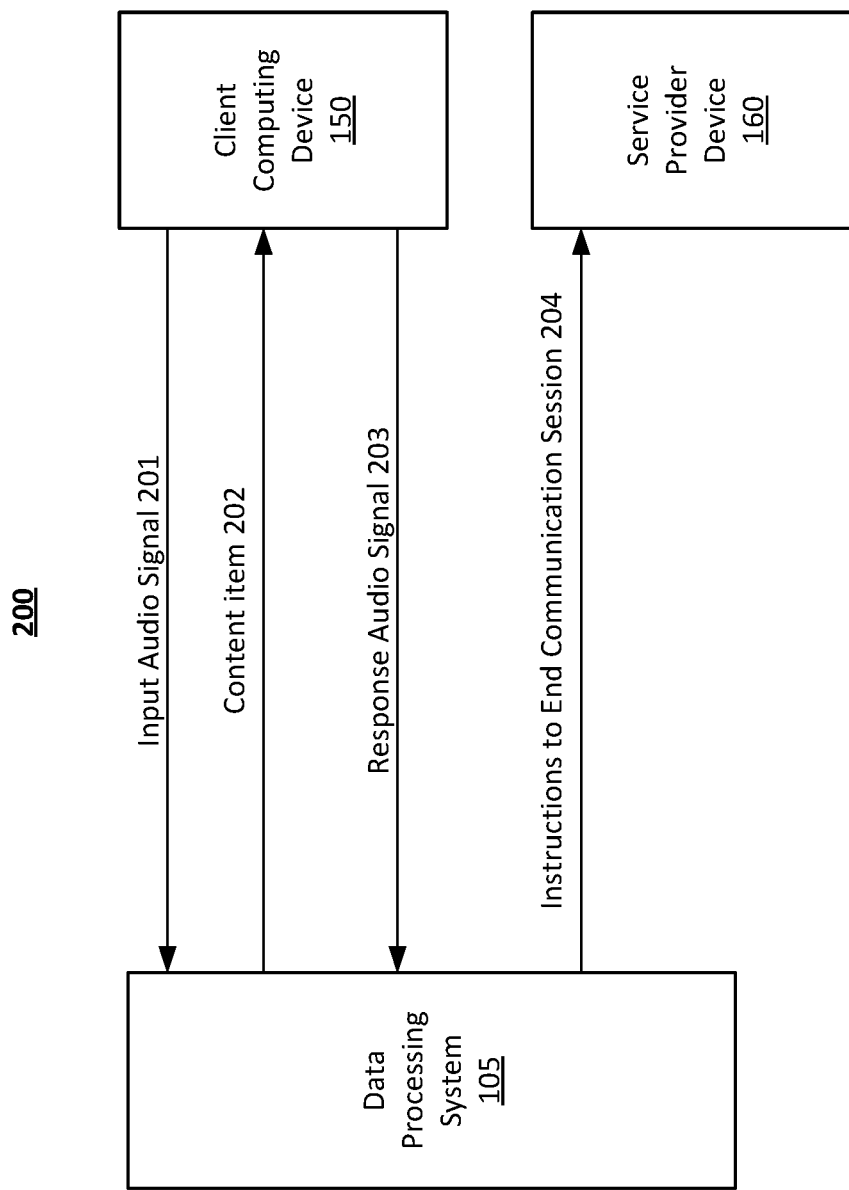
FIG. 2 illustrates a flow diagram illustrating an example operation of a system to perform authentication of packetized audio signals.

FIG. 2 illustrates a flow diagram illustrating an example operation of a system 200 to perform authentication of audio signals. The system 200 can include one or more of the components or elements described above in relation to system 100. For example, the system 200 can include a data processing system 105 that is in communication with a client computing device 150 and a service provider computing device 160, via, for example, the network 165.

The operation of the system 200 can begin with the client computing device 150 transmitting an input audio signal 201 to the data processing system 105. Once the data processing system 105 receives the input audio signal, the NLP component 110 of the data processing system 105 can parse the input audio signal into a request and a trigger keyword that corresponds to the request. A communication session can be established between the client computing device 150 and the service provider computing device 160, via the data processing system 105.

The direct action API 135 can generate an action data structure based on the request. For example, the input audio signal can be "I want a ride to the movies." In this example, the direct action API 135 can determine the request is for a car service. The direct action API 135 can determine the current location of the client computing device 150 that generated the input audio signal and can determine the location of the nearest movie theater. The direct action API 135 can generate an action data structure that includes the location of the client computing device 150 as the pickup location for the car service and includes the location of the nearest movie theater as the destination of the car service. The action data structure can also include one or more characteristics of the input audio signal. The data processing system 105 can pass the action data structure to the network security appliance to determine whether an alarm condition should be set.

If the network security appliance detects an alarm condition, the data processing system 105 can select, via the content selector component 125, a content item. The data processing system 105 can provide the content item 202 to the client computing device 150. The content item 202 can be provided to the client computing device 150 as part of a communication session between the data processing system 105 and the client computing device 150. The communication session can have the flow and feel of a real-time person to person conversation. For example, the content item can include audio signal that are played at the client computing device 150. The end user can respond to the audio signal, which can be digitized by the sensor 151 and transmitted to the data processing system 105. The content item can be a security question, content item, or other question that is transmitted to the client computing device 150. The question can be presented, via the transducer 152, to the end user that generated the input audio signal. In some implementations, the security question can be based on past interaction between the client computing device 150 and the data processing system 105. For example, if prior to the transmission of input audio signal, the user ordered a pizza via the system 200 by providing the input audio signal of "Ok, order a pizza," the security questions could include "what did you order for dinner last night." The content item can also include a request for a password to be provided to the data processing system 105. The content item can include a push notification to a second computing device 150 associated with the first computing device 150. For example, a push notification requesting confirmation of the input audio signal can be sent to a smartphone associated with the client computing device 150. The user can select the push notification to confirm that the input audio signal is authentic.

During the communication session between the client computing device 150 and the data processing system 105, the user can respond to the content item. The user can verbally respond to the content item. The response can be digitized by the sensor 151 and transmitted as a response audio signal 203 carried by a plurality of data packets to the data processing system 105. The auditory signal can also include characteristics, which can be analyzed by the network security appliance. If the network security appliance determines that an alarm condition persists based on the conditions of the response audio signal, the network security appliance can send a message 204 to the service provider computing device 160. The message 204 can include instructions for the service provider computing device 160 to disable the communication session with the client computing device 150.

Figure 3:
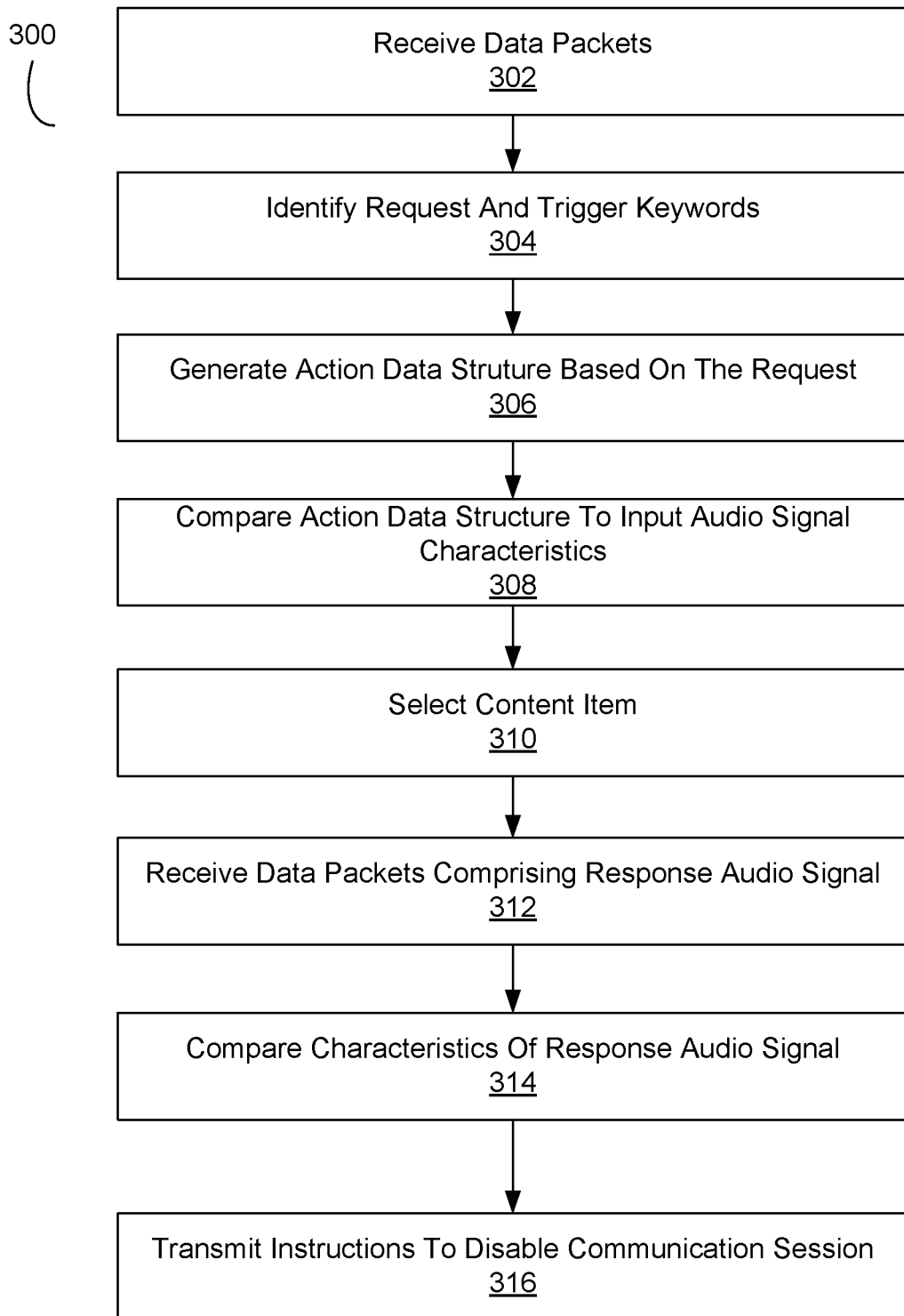
FIG. 3 illustrates an example method to authenticate packetized audio signals in a voice activated data packet (or other protocol) based computer network environment using the system illustrated in FIG. 1.

FIG. 3 illustrates an example method 300 to authenticate packetized audio signals in a voice activated data packet (or other protocol) based computer network environment. The method 300 can include receiving data packets that include an input audio signal (ACT 302). For example, the data processing system can execute, launch, or invoke the NLP component to receive packet or other protocol based transmissions via the network from the client computing device. The data packets can include or correspond to an input audio signal detected by the sensor, such as an end user saying "Ok, I would like to go to go dinner and then a movie tonight" into a smartphone.

The method 300 can include identifying a request and a trigger keyword within the input audio signal (ACT 304). For example, the NLP component can parse the input audio signal to identify requests (such as "dinner" or "movie" in the above example) as well as trigger keywords "go" "go to" or "to go to" that correspond or relate to the request.

The method 300 can include generating a first action data structure based on the request (ACT 306). The direct action API can generate a data structure that can be transmitted and processed by the service provider computing device or content provider computing device to fulfil the request of the input audio signal. For example, continuing the above example the direct action API can generate a first action data structure that is transmitted to a restaurant reservation service. The first action data structure can perform a search for a restaurant that is located near the current location of the client computing device and that meets other specifications associated with the user of the client computing device (e.g., cuisine types preferred by the user of the client computing device). The direct action API can also determine a preferred time for the reservation. For example, the data processing system can determine the restaurant selected during the search is 15 minutes away and that the current time is 6:30 PM. The data processing system can set the preferred reservation time at a time after 6:45 PM. In this example, the first action data structure can include the restaurant name and the preferred reservation time. The data processing system can transmit the first action data structure to the service provider computing device or the content provider computing device. ACT 306 can include generating multiple action data structures. For the above input audio signal, a second action data structure that includes a movie title and restaurant name can be generated and a third action data structure that includes pick up and drop off locations can be generated. The data processing system can provide the second action data structure to a movie ticket reservation service and the third action data structure to a car reservation service.

The method 300 can also include comparing the first action data structure with a characteristic of the input audio signal (ACT 308). The network security appliance can compare the characteristic of the input audio signal to the first action data structure to determine the authenticity of the input audio signal. Determining the authenticity of the input audio signal can include determining whether the person that generated the input audio signal is authorized to generate input audio signals. The characteristics of the input audio signal can include a voiceprint, a keyword, a number of voices detected, an identification of an audio source (e.g., an identification of the sensor or client computing device from where the input audio signal originated), a location of an audio source, or the location of another client computing device (and the distance between the other client computing device and the audio source). For example, an authorized voiceprint can be generated during a setup phase by having a user speak passages. As those passages are spoken, the network security appliance can generate a voiceprint based on the frequency content, quality, duration, intensity, dynamics, and pitch of the signal. The network security appliance can generate an alarm condition if the network security appliance determines the characteristics of the input audio signal do not match the first action data structure or other expected data. For example, when generating an action data structure for "Ok, I would like to go to go dinner and then a movie tonight," the data processing system can generate an action data structure for a car reservation service that includes a pickup location based on the location of the user's smartphone. The action data structure can include the location. The input audio signal can be generated by an interactive speaker system. The location of the interactive speaker system transmitted to the data processing system with the input audio signal. In this example, if the location of the user's smartphone does not match the location of the interactive speaker system (or is not within a pre-defined distance of the interactive speaker system), then the user is not near the interactive speaker system and the network security appliance can determine the user most likely did not make the input audio signal. The network security appliance can generate an alarm condition. The distance between the client computing device 150 and a secondary client device (e.g., the end user's smartphone) can be calculated as a straight linear distance between the two device, a driving distance between the two devices. The distance can also be based on travel time between the locations of the two devices. The distance may be based on other characteristics that can indicate location such as IP address and Wi-Fi network locations.

The method 300 can include selecting a content item (ACT 310). The content item can be based on the trigger keyword and the alarm condition and can be selected via a real-time content selection process. The content item can be selected to authenticate the input audio signal. The content item can be a notification, online document, or message that is displayed on a client computing device, such as a user's smartphone. The content item can be an audio signal that is transmitted to the client computing device and broadcast to the user via the transducer. The content item can be a security question. The security question can be a predefined security question, such as a request for a password. The security question can be dynamically generated. For example, the security can be a question generated based on the prior history of the user or client computing device.

The method 300 can include receiving data packets carrying auditory signals (ACT 312). The data packets can carry auditory signals transmitted between the client computing device and the conversational API of the data processing system. The conversational API can establish a communication session with the data processing system responsive to interaction with the content item. The auditory signals can include the user's response to the content item transmitted to the client computing device during ACT 310. For example, the content item can cause the client computing device to generate an audio signal asking "what is your authorization code"? The auditory signals can include the end user response to the content item. The end user response to the content item can be a characteristic of the response audio signal.

The method 300 can also include comparing a characteristic of the response audio signal with a characteristic of the input audio signal (ACT 314). The response audio signal can include a passphrase or other characteristics. The content item can include instructions for the client computing device to capture one or more specific characteristics of the response audio signal. For example, the characteristic of the input audio signal can be a location of the client computing device. The characteristic of the response audio signal can be different than the characteristic of the input audio signal. For example, the characteristic of the response audio signal can be a voiceprint. The content item can include instructions for capturing the voiceprint characteristic. The instructions can include capturing the response audio signal at a higher sampling frequency so that additional frequency content can be analyzed for the voiceprint. If the system does not detect a match between the characteristics of the response audio signal and the input audio signal, the system can set an alarm condition. For example, if the characteristics of the response audio signal include a passphrase that does not match a passphrase associated with the input audio signal, the alarm condition can be set.

If the characteristics of the response audio signal matches the characteristic of the input audio signal (e.g., the passphrases (or hashes thereof) match). A pass condition can be set. When a pass condition is set, the system can transmit instructions to a third-part to continue the communication session with the client device. The instructions to continue the communication session can authenticate the communication session for a predetermined amount of time such that the communication session does not need to be reauthenticated until expiration of the predetermined time.

The method 300 can also include transmitting an instruction to a third-party provider device to disable the communication session (ACT 316). Disabling the communication session can prevent messages and action data structures from being transmitted to the service provider device. This can improve network utilization by decreasing unwanted network traffic. Disabling the communication session can reduce computational waste because the service provider devices does not process requests that are malicious or generated in error.

Figure 4:
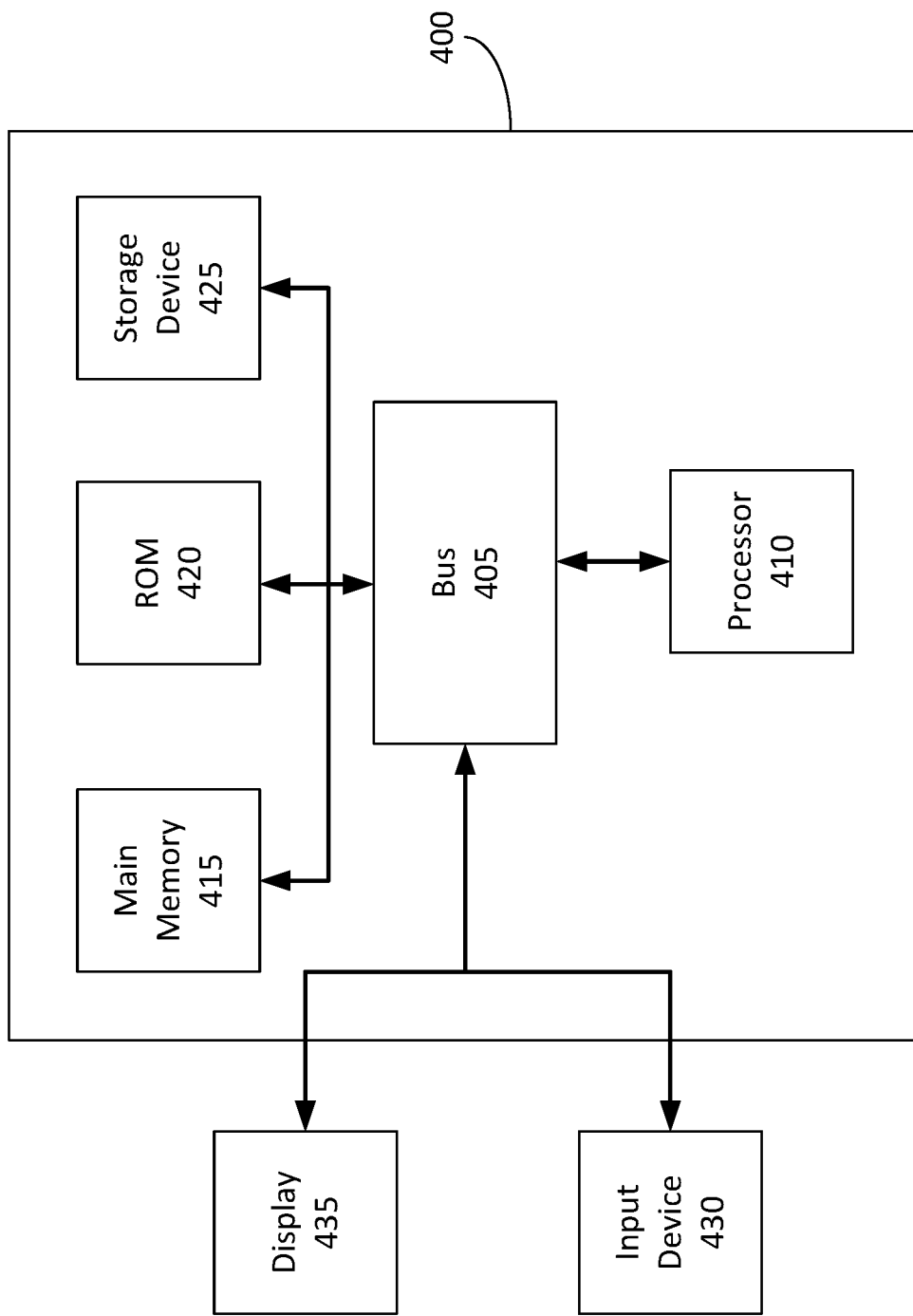
FIG. 4 is a block diagram illustrating a general architecture for a computer system that may be employed to implement elements of the systems and methods described and illustrated herein.

FIG. 4 is a block diagram of an example computer system 400. The computer system or computing device 400 can include or be used to implement the system 100 or its components such as the data processing system 105. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 105, the client computing device 150 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The direct action API 135, content selector component 125, network security appliance 123, or NLP component 110 and other data processing system 105 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 105 from the client computing device 150 or the content provider computing device 155 or the service provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110, the content selector component 125, or the network security appliance 123 can be a single component, app, or program, or a logic device having one or more processing circuits, or part of one or more servers of the data processing system 105.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B '" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A system to authenticate packetized audio signals in a voice activated computer network environment, comprising:
    a data processing system comprising at least one processor and memory;
    a natural language processor component executed by the data processing system to receive, via an interface of the data processing system, data packets comprising an input audio signal detected by a sensor of a client device;
    the natural language processor component to parse the input audio signal to identify a request and a trigger keyword corresponding to the request;
    a direct action application programming interface of the data processing system to generate, based on the trigger keyword, a first action data structure responsive to the request, the first action data structure comprising one or more parameters packaged together to cause a third party provider device to perform an action;
    a conversational application programming interface of the data processing system to establish, based on the first action data structure, a communication session between the third party provider device and the client device;
    a network security appliance of the data processing system to:
        compare a parameter of the first action data structure with a first characteristic of the input audio signal; and
        generate a first alarm condition responsive to the first characteristic of the input audio signal not matching the parameter of the first action data structure;
    a content selector component of the data processing system to select, responsive to generation of the first alarm condition and based on the trigger keyword, a content item for provision to the client device for authentication of the input audio signal;
    the network security appliance to:
        receive a second set of data packets from the client device, the second set of data packets comprising a response audio signal comprising a response to the content item provisioned to the client device for authentication of the input audio signal;
        generate a second alarm condition responsive to a second characteristic of the response audio signal not matching a second parameter of the first action data structure; and
        transmit, responsive to generation of the second alarm condition, an instruction to the third party provider device to disable the communication session established with the client device.

2. The system of claim 1, the network security appliance to:
    determine the first characteristic of the input audio signal; and
    determine the second characteristic of the response audio signal, wherein the first characteristic and the second characteristic comprise at least one of a voiceprint, a keyword, a number of voices detected, an identification of the client device, or a location of a source of the input audio signal.

3. The system of claim 1, wherein the first characteristic is different from the second characteristic.

4. The system of claim 1, the network security appliance to:
receive a location of a second client device;
determine a distance between a location of the client device and the location of the second client device; and
detect the first alarm condition based on the distance between a location of the client device and the location of the second client device.

5. The system of claim 4, the network security appliance to:
detect the first alarm condition based on the distance between a location of the client device and the location of the second client device being above a predetermined threshold.

6. The system of claim 1, wherein the content item comprises instructions for generating an auditory signal at the client device.

7. The system of claim 6, wherein the auditory signal comprises a security question.

8. The system of claim 1, the network security appliance to:
disable the first action data structure responsive to detection of the first alarm condition.

9. The system of claim 1, the content selector component to:
generate instructions to capture the second characteristic of the response audio signal in the content item.

10. The system of claim 1, the network security appliance to:
terminate the communication session established with the client device in response to an interaction with the content item.

11. The system of claim 1, the network security appliance to determine an amount of computational resources required to complete the request.

12. The system of claim 11, the network security appliance to set the first alarm condition responsive to the amount of computational resources being above a predetermined threshold.

13. The system of claim 1, the natural language processor component to parse the response audio signal to identify a passphrase.

14. The system of claim 13, the network security appliance to set the second alarm condition based on the passphrase not matching a stored passphrase.

15. The system of claim 13, wherein the passphrase is the second characteristic.

16. A method for authenticating packetized audio signals in a voice activated computer network environment, comprising:
receiving, by a natural language processor component executed by a data processing system, data packets comprising an input audio signal detected by a sensor of a client device;
parsing, by the natural language processor component, the input audio signal to identify a request and a trigger keyword corresponding to the request;
generating, by a direct action application programming interface of the data processing system, based on the trigger keyword, a first action data structure responsive to the request, the first action data structure comprising one or more parameters packaged together to cause a third party provider device to perform an action;
generating, by a conversational application programming interface of the data processing system and based on the first action data structure, a communication session between the third party provider device and the client device;
comparing, by a network security appliance of the data processing system, a parameter of the first action data structure with a first characteristic of the input audio signal;
generating, by the network security appliance, a first to detect an alarm condition responsive to the first characteristic of the input audio signal not matching the parameter of the first action data structure;
selecting, by a content selector component executed by the data processing system and responsive to generation of the first alarm condition, a content item for provision to the client device for authentication of the input audio signal;
receiving, by the network security appliance, a second set of data packets from the client device, the second set of data packets comprising a response audio signal comprising a response to the content item provisioned to the client device for authentication of the input audio signal;
generating, by the network security appliance, a second alarm condition responsive to a second characteristic of the response audio signal not matching a second parameter of the first action data structure; and
transmitting, by the network security appliance, responsive to the generation of the second alarm condition, an instruction to the third party provider device to disable the communication session established with the client device.

17. The method of claim 16, comprising:
determining, by the network security appliance, the first characteristic of the input audio signal; and
determining, by the network security appliance, the second characteristic of the response audio signal, wherein the first characteristic and the second characteristic comprise at least one of a voiceprint, a keyword, a number of voices detected, an identification of the client device, or a location of a source of the input audio signal.

18. The method of claim 16, comprising:
receiving, by the network security appliance, a location of a second client device;
determining, by the network security appliance, a distance between a location of the client device and the location of the second client device; and
detecting, by the network security appliance, the alarm condition based on the distance between a location of the client device and the location of the second client device.

19. A system to authenticate packetized audio signals in a voice activated computer network environment, comprising:
a data processing system comprising at least one processor and memory;
a natural language processor component executed by the data processing system to receive, via an interface of the data processing system, data packets comprising an input audio signal detected by a sensor of a client device;
the natural language processor component to parse the input audio signal to identify a request and a trigger keyword corresponding to the request;
a direct action application programming interface of the data processing system to generate, based on the trigger keyword, a first action data structure responsive to the request;

a conversational application programming interface of the data processing system to establish, based on the first action data structure, a communication session between a third party provider device and the client device;

a network security appliance of the data processing system to:
  compare a parameter of the first action data structure with a first characteristic of the input audio signal;
  generate a first alarm condition responsive to the first characteristic of the input audio signal not matching the parameter of the first action data structure;

a content selector component executed by the data processing system to select, responsive to generation of the first alarm condition and based on the trigger keyword, a content item for provision to the client device for authentication of the input audio signal;

the network security appliance to:
  receive a second set of data packets from the client device, the second set of data packets carrying a response audio signal comprising a response to the content item provisioned to the client device for authentication of the input audio signal;
  generate a pass condition responsive to a second characteristic of the response audio signal matching with a second parameter of the first action data structure; and
  transmit, based on the generation of the pass condition, an instruction to the third party provider device to continue the communication session established with the client device.

20. The system of claim 19, the network security appliance to:
  determine the first characteristic of the input audio signal; and
  determine the second characteristic of the response audio signal, wherein the first characteristic and the second characteristic comprise at least one of a voiceprint, a keyword, a number of voices detected, an identification of the client device, or a location of a source of the input audio signal and the second characteristic comprises a security question.

* * * * *